United States Patent
Park et al.

(10) Patent No.: US 12,482,848 B2
(45) Date of Patent: Nov. 25, 2025

(54) PROCESS AUTOMATION SYSTEM

(71) Applicant: LG ENERGY SOLUTION, LTD., Seoul (KR)

(72) Inventors: Heung-Kun Park, Daejeon (KR); Choon-Kwon Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 624 days.

(21) Appl. No.: 17/777,768

(22) PCT Filed: Aug. 5, 2021

(86) PCT No.: PCT/KR2021/010362
§ 371 (c)(1),
(2) Date: May 18, 2022

(87) PCT Pub. No.: WO2022/035133
PCT Pub. Date: Feb. 17, 2022

(65) Prior Publication Data
US 2022/0416286 A1 Dec. 29, 2022

(30) Foreign Application Priority Data
Aug. 11, 2020 (KR) ........................ 10-2020-0100691

(51) Int. Cl.
*H01M 10/04* (2006.01)
*G01R 31/396* (2019.01)
(Continued)

(52) U.S. Cl.
CPC ...... *H01M 10/0404* (2013.01); *G01R 31/396* (2019.01); *H01M 10/4207* (2013.01);
(Continued)

(58) Field of Classification Search
CPC .... H01M 10/0404; H01M 10/42; H01M 4/04; H01M 50/264; H01M 10/0422; Y10T 29/53135
(Continued)

(56) References Cited

U.S. PATENT DOCUMENTS 12,046,706 B2 * 7/2024 Oh ...................... H01M 50/264
12,087,932 B2 * 9/2024 Chung .................... B26D 9/00
(Continued)

FOREIGN PATENT DOCUMENTS

CN 205944305 U 2/2017
CN 109671967 A 4/2019
(Continued)

OTHER PUBLICATIONS

International Search Report for PCT/KR2021/010362 mailed on Nov. 22, 2021.
(Continued)

*Primary Examiner* — Thiem D Phan
(74) *Attorney, Agent, or Firm* — Birch, Stewart, Kolasch & Birch, LLP

(57) ABSTRACT

Discussed is a a process automation system including: a cell transferor configured to transfer battery cells; a cell inspector configured to measure an open circuit voltage of each battery cell in units of a preset number of battery cells and to sort out qualified battery cells and defective battery cells; a frame transferor configured to transfer module frames of a battery module to insert the qualified battery cells; a cell discharger configured to load and discharge the defective battery cells; and a gripper configured to pick up one or more battery cells from any one device among the cell transferor, the cell inspector, the frame transferor, and the cell discharger, and transport the one or more battery cells to another device.

16 Claims, 9 Drawing Sheets

(51) Int. Cl.
  *H01M 10/42* (2006.01)
  *H01M 50/258* (2021.01)

(52) U.S. Cl.
  CPC ...... *H01M 10/4221* (2013.01); *H01M 50/258* (2021.01); *Y10T 29/53135* (2015.01)

(58) Field of Classification Search
  USPC .......................... 29/730, 592.1, 623.1, 729
  See application file for complete search history.

(56) References Cited

U.S. PATENT DOCUMENTS

| | | |
|---|---|---|
| 2011/0234232 A1 | 9/2011 | Ro |
| 2012/0133371 A1 | 5/2012 | Toomre et al. |
| 2013/0255068 A1 | 10/2013 | Turner, III |
| 2013/0317639 A1 | 11/2013 | Choi et al. |
| 2017/0324121 A1 | 11/2017 | Yau |

FOREIGN PATENT DOCUMENTS

| | | |
|---|---|---|
| CN | 110574221 A | 12/2019 |
| CN | 111438082 A | 7/2020 |
| JP | 10-253723 A | 9/1998 |
| JP | 2002-166234 A | 6/2002 |
| JP | 2008-117241 A | 5/2006 |
| JP | 2012-138182 A | 7/2012 |
| JP | 6214629 B2 | 10/2017 |
| KR | 10-2011-0107070 A | 9/2011 |
| KR | 10-1167096 B1 | 7/2012 |
| KR | 10-1428109 B1 | 8/2014 |
| KR | 10-2015-0049527 A | 5/2015 |
| KR | 10-2015-0137583 A | 12/2015 |
| KR | 10-2016-0051063 A | 5/2016 |
| KR | 10-1650504 B1 | 8/2016 |
| KR | 10-2017-0016179 A | 2/2017 |
| KR | 10-2017-0071077 A | 6/2017 |
| KR | 10-1962918 B1 | 3/2019 |
| KR | 10-2039261 B1 | 10/2019 |
| KR | 10-2043112 B1 | 11/2019 |

OTHER PUBLICATIONS

Lin Cheng, "Pure electric vehicle design," Electric Vehicle Engineering Handbook, Machinery Industry Press, vol. 1, 2019, 10 pages total.

Extended European Search Report for European Application No. 21856139.7, dated May 29, 2024.

* cited by examiner

PROCESS AUTOMATION SYSTEM

TECHNICAL FIELD

The present disclosure relates to a process automation system, and more particularly, to a process automation system, in which a process device for grading of battery cells and a process device for inserting qualified battery cells into a module frame of a battery module are integrated.

The present application claims priority to Korean Patent Application No. 10-2020-0100691 filed on Aug. 11, 2020 in the Republic of Korea, the disclosure of which is incorporated herein by reference.

BACKGROUND ART

In general, a secondary battery refers to a rechargeable battery unlike a primary battery which is non-rechargeable, and is widely used in electronic devices such as mobile phones, laptop computers, camcorders, or the like or electric vehicles. In particular, a lithium secondary battery has an operating voltage of about 3.5 V to 3.6 V, that is, a greater capacity than a nickel-cadmium battery or a nickel-hydrogen battery which are frequently used as a power source for electronic equipment, and also has a relatively high energy density per unit weight, and thus the extent of using the lithium secondary battery is rapidly increasing.

The lithium secondary battery includes an electrode assembly including a positive electrode, a negative electrode, and a separator formed between the positive electrode and the negative electrode to insulate the positive electrode from the negative electrode. The lithium secondary battery is formed by performing a formation process and an aging process, and due to various reasons, defects frequently occur during the processes, and thus, it is important to sort out the defects accurately. Recently, to sort out a defect in a secondary battery, a method of sorting out a low-voltage defect of a secondary battery during an activation process has been used.

However, even though a secondary battery was graded as normal in the activation process, over a storage period to a point when the secondary battery is assembled into a battery module after the activation process, a defect may additionally be generated in the secondary battery. In addition, a product that is to be determined to have a low-voltage defect may be incorrectly determined as normal and be assembled into a battery module.

A battery module is configured by connecting a plurality of battery cells in series and in parallel, and when the performance and capacity of the battery cells vary, the quality of the battery module may be decided by the performance of a battery cell of the lowest grade. The battery module as above has a short lifespan and has varying, irregular performance, degrading the product reliability.

As disclosed in KR 10-2015-0049527, the applicant has introduced a battery cell grade classification system that allows classifying battery cells according to capacity, in which battery cells mounted in a certain battery module are controlled to have substantially the same capacity.

The battery cell grade classification facility includes, as illustrated in FIG. 1, a cell supply line 11, an open circuit voltage testing equipment 12, and a plurality of cell discharge lines 13 through 17 for classifying battery cells according to grade.

As illustrated in FIG. 1, battery cells 20 are classified into first to fourth grades and a defective category based on open voltage values thereof. The battery cells according to the respective grades, which have undergone the battery cell grade classification facility, are loaded into a separate loading tray and transported to a location where a battery module assembly process facility is located.

However, recently, research into the improvement of the battery cell process efficiency has become an issue, and as part of that, development of a facility into which a battery cell classification process and a battery module assembly process, which are essential processes of a battery cell process, can be integrated is required.

DISCLOSURE

Technical Problem

The present disclosure is designed to solve the problems of the related art, and therefore the present disclosure is directed to providing a process automation system, in which a process device for grading of battery cells and a process device for inserting qualified battery cells into a module frame of a battery module are integrated.

It will be readily understood by those skilled in the art that the objects of the present disclosure can be realized by the means and combinations thereof indicated in the following detailed description and the claims.

Technical Solution

In one aspect of the present disclosure, there is provided a process automation system including: a cell transfer unit configured to transfer battery cells; a cell inspection unit configured to measure an open circuit voltage of each battery cell in units of a preset number of battery cells and sort out qualified battery cells and defective battery cells; a frame transfer unit configured to transfer module frames of a battery module to insert the qualified battery cells; a cell discharging unit configured to load and discharge the defective battery cells; and a gripper unit configured to pick up one or more battery cells from any one device among the cell transfer unit, the cell inspection unit, the frame transfer unit, and the cell discharging unit, and transport the one or more battery cells to another device.

Each of the battery cells may include a QR code, and the cell inspection unit may be configured to scan the QR code and transmit an open circuit voltage value of each battery cell to a server.

The cell inspection unit may include: a voltage measuring device configured to measure the open circuit voltage of each battery cell; and a QR code scanner of each battery cell.

The cell inspection unit may further include a turntable including cell holders arranged at an edge of the turntable in a circumferential direction, the turntable being configured to be rotated clockwise or counter-clockwise, wherein the voltage measuring device and the QR Scanner are arranged opposite to each other with the turntable therebetween.

The battery cells may include cylindrical battery cells, and the cell inspection unit may further include a cell inverter arranged above one side edge of the turntable and configured to invert, up and down, one or more battery cells inserted into the cell holders.

The cell inverter may include: a clamp configured to hold at least one of the battery cells inserted into the cell holders; a rotator configured to rotate the clamp by ±180 degrees; and a moving block connected to the rotator and configured to be movable in a vertical direction.

Four cell holders may be arranged on the turntable in a square composition, and the process automation system may be configured such that, as the turntable is rotated, measurement of voltages of the battery cells respectively mounted in the cell holders, scanning of a QR code of the battery cells, vertical inversion of the battery cells are performed.

The frame transfer unit may include a first frame transfer unit and a second frame transfer unit extending and arranged in parallel with each other, and the cell inspection unit may be arranged between the first frame transfer unit and the second frame transfer unit.

The cell inspection unit may include a control unit configured to determine battery cells having the open circuit voltage of a value falling within a preset first set range, as first qualified battery cells, and determine battery cells having the open circuit voltage of a value falling within a preset second set range, as second qualified battery cells.

The process automation system may further include a temporary loading unit configured to temporarily load the first qualified battery cells or the second qualified battery cells.

The control unit may be further configured to control the gripper unit such that the first qualified battery cells are supplied to the first frame transfer unit and the second qualified battery cells are supplied to the second frame transfer unit.

The cell discharging unit may include discharge trays provided to load the defective battery cells and a conveyor for moving the discharge trays.

Advantageous Effects

According to an aspect of the present disclosure, a process automation system, in which a process device for grading each battery cell and a process device for inserting qualified battery cells into a module frame of a battery module are integrated, may be provided.

For example, as in the method according to the related art, when battery cells are classified by grade at the location where a cell classification facility is located, and the battery cells graded as qualified are moved from the location to another location where a battery module assembly facility is located, and then inserted into a module frame of a battery module, time and effort are required to transport the battery cells. In addition, establishing each process facility requires high equipment investment costs.

However, according to the present disclosure, by establishing a process automation system, grade classification of battery cells, assembly of a battery module, and discharging of defective battery cells may be integrally performed, thereby remarkably improving the facility efficiency and logistics transportation.

The effects of the present disclosure will be clearly understood by the following examples of the present disclosure. It will also be readily apparent that the present disclosure can be realized by the means and combinations thereof indicated in the claims of the present disclosure.

DESCRIPTION OF DRAWINGS

The accompanying drawings illustrate a preferred embodiment of the present disclosure and together with the detailed description of the disclosure given below, serve to provide further understanding of the technical features of the present disclosure, and thus, the present disclosure is not construed as being limited to the drawings.

BEST MODE

Figure 1:
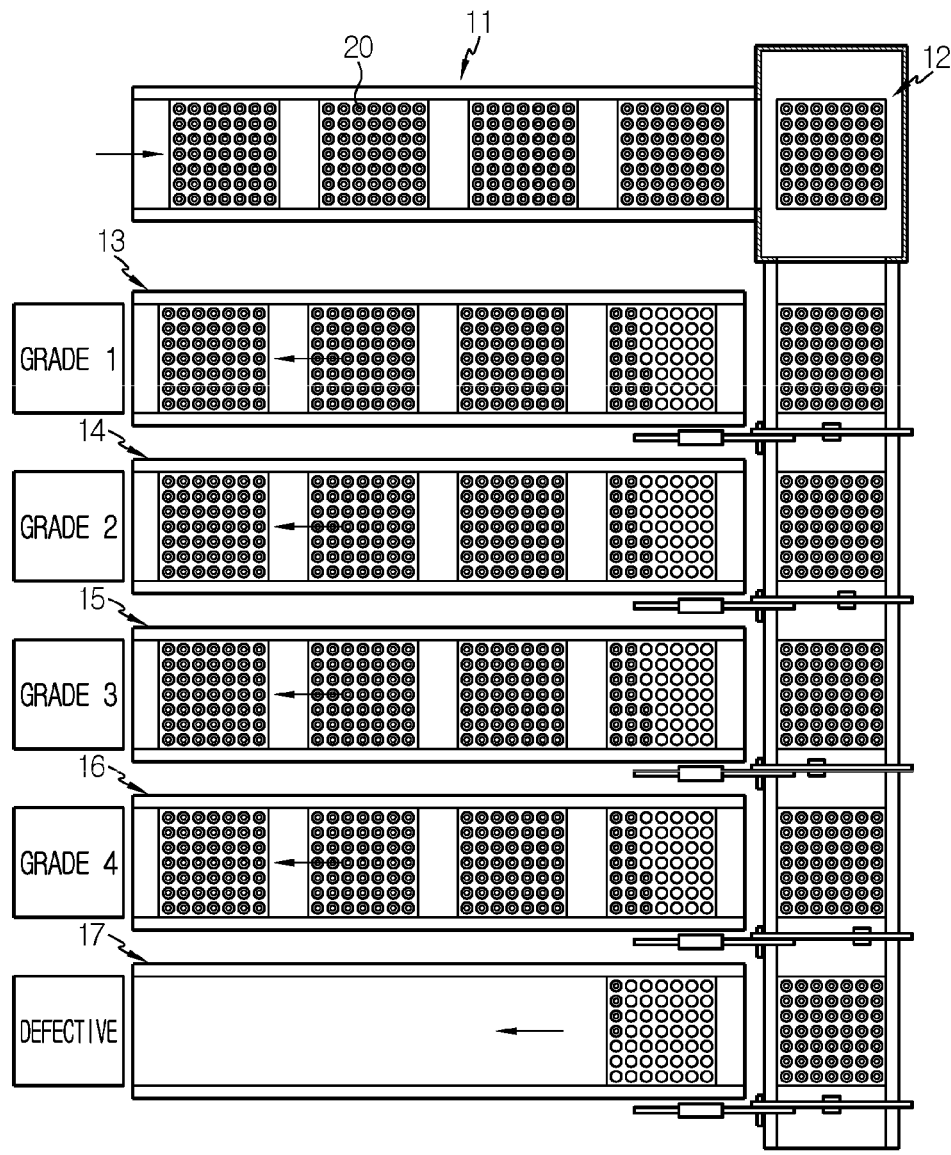
FIG. 1 is a schematic view of a battery cell grade classification apparatus according to the related art.
Figure 1:
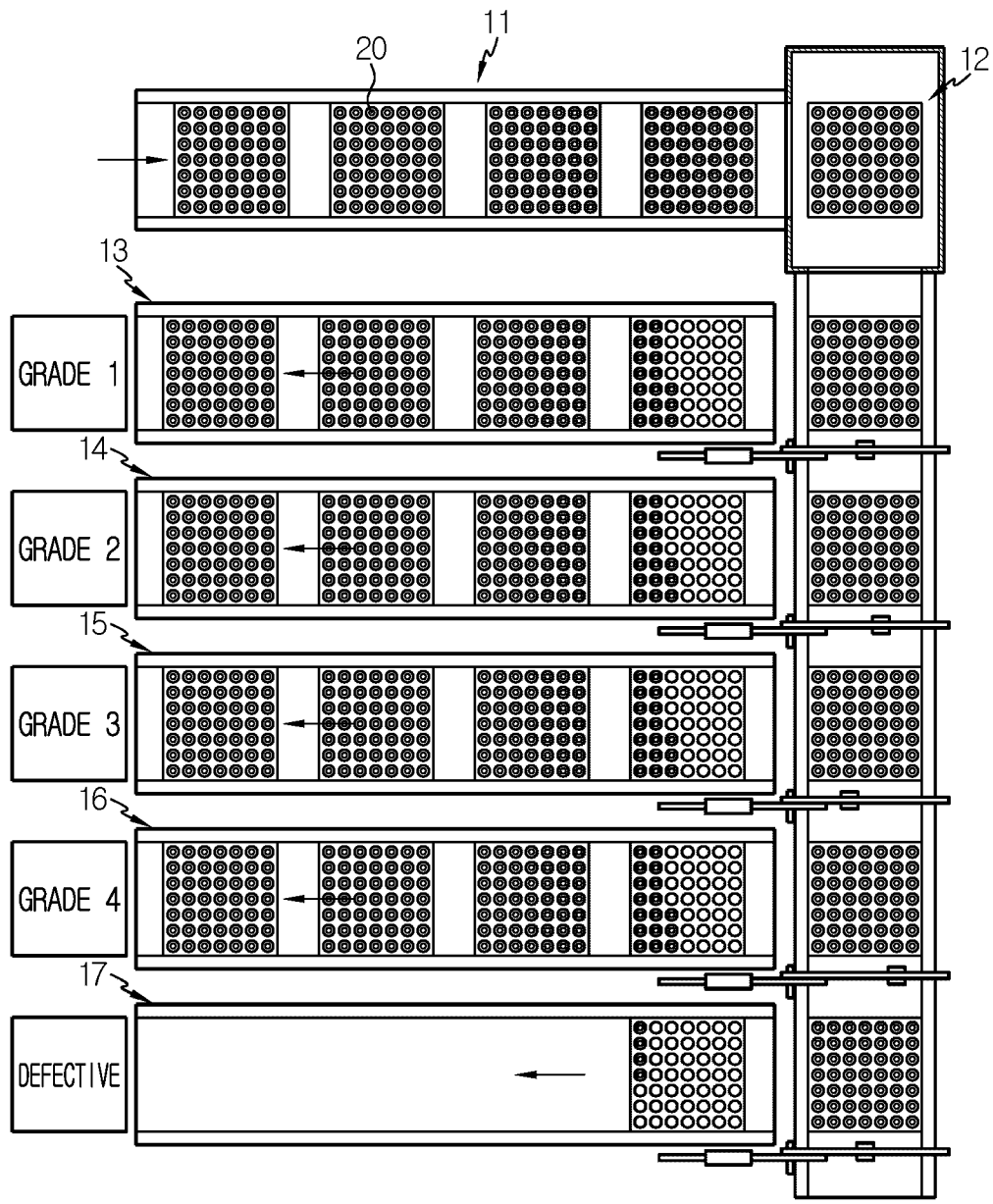

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the configurations disclosed in the embodiments and drawings of the present specification are merely a preferred embodiment of the present disclosure and do not entirely represent the technical spirit of the present disclosure, and thus it should be understood that there can be various alternative equivalents or modification examples that can replace the preferred embodiments at the point of the filing of the present application.

The embodiments of the present disclosure are provided so that this disclosure will be thorough and complete and will fully convey the present disclosure to one of ordinary skill in the art. In the drawings, shapes and sizes of components may be exaggerated or omitted or schematically illustrated for clear description. Thus, the size or ratio of each component does not perfectly reflect an actual size.

Figure 2:
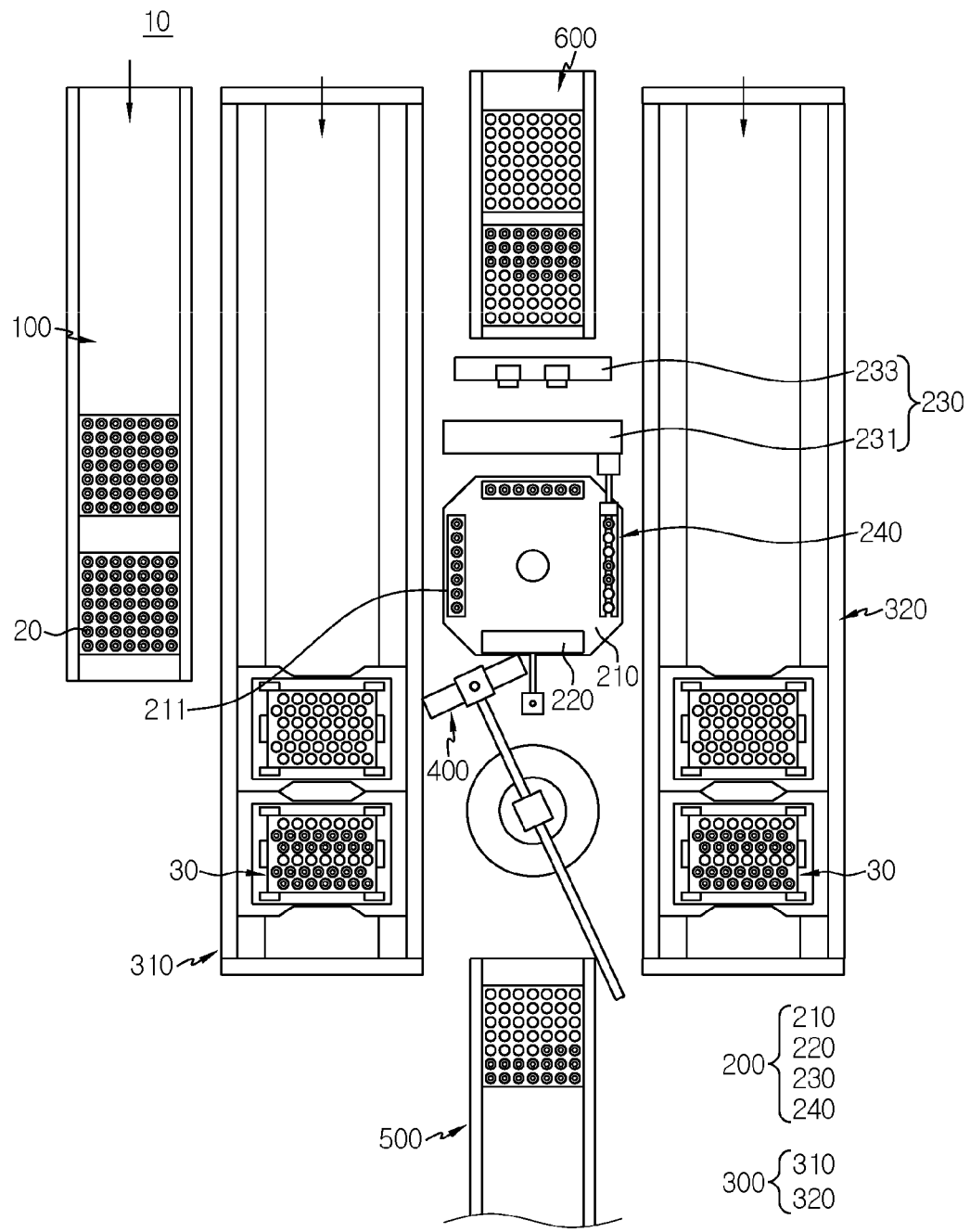
FIG. 2 is a schematic plan view illustrating major components of a process automation system according to an embodiment of the present disclosure.
Figure 3:
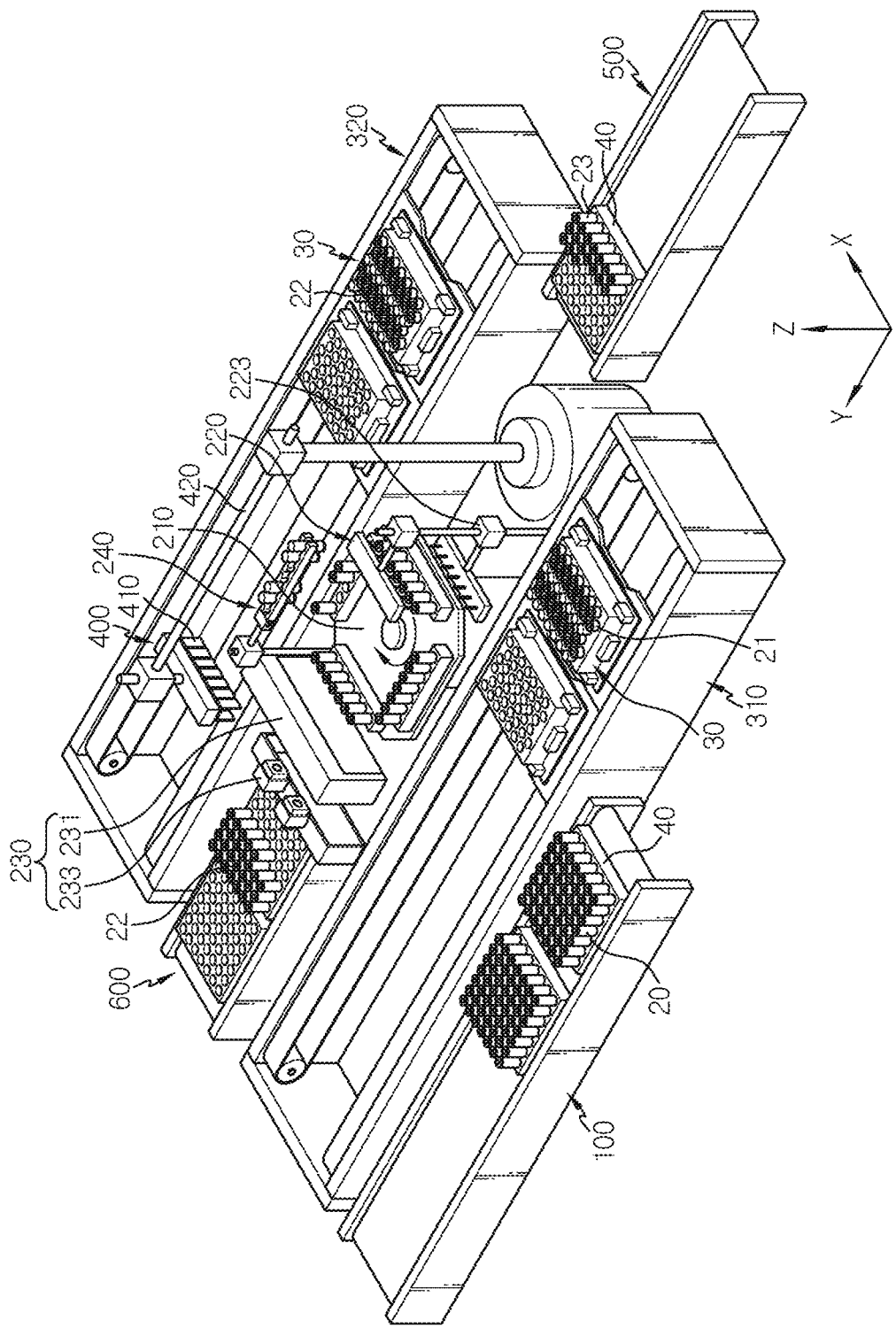
FIG. 3 is a schematic perspective view of the process automation system of FIG. 2.

Referring to FIGS. 2 and 3, a battery cell process automation system 10 according to an embodiment of the present disclosure includes a cell transfer unit 100, a cell inspection unit 200, a frame transfer unit 300, a gripper unit 400, and a cell discharging unit 500.

The battery cell process automation system 10 according to the present embodiment to be described below may be applied to performing of a process of inserting the battery cells 20 into a module frame 30 in a process of grading and classification of the battery cells 20 and assembling into a battery module.

The battery cells 20 refer to cylindrical battery cells in the present embodiment. However, the present disclosure is not limited to the cylindrical battery cell. For example, the battery cells 20 may be prismatic or pouch-shaped, and in this case, the shape of a tray or module frame for accommodating the battery cells 20 may be configured differently from the present embodiment according to the type of battery cells.

The cell transfer unit 100 may be implemented as a conveyor as a means for moving the battery cells 20. The battery cells 20 may be accommodated in a tray 40 and moved along the conveyor to be positioned adjacent to the cell inspection unit 200. The conveyor may also be replaced by other means of logistics transportation. That is, any logistics transportation means for stably transporting the battery cells 20 may be applied instead of a conveyor.

The cell inspection unit 200 may be configured to receive the battery cells 20 from the cell transfer unit 100, measure open circuit voltages (OCV) of the battery cells 20, and grade each battery cell 20 based on a preset range of the open circuit voltages.

In addition, the cell inspection unit 200 may be configured to additionally inspect management indicators such as internal resistance (IR), K-value, etc. in addition to the open circuit voltage when grading each battery cell.

In addition, the cell inspection unit 200 may be configured to identify each battery cell 20 through a QR code 20a provided for each battery cell 20, and transmit information such as the open circuit voltage (OCV) and the internal resistance (IR) of the identified battery cells 20, or the like, to a server.

In addition, as illustrated in FIGS. 2 to 7, the cell inspection unit 200 according to the present embodiment may include a turntable 210, a voltage measuring device 220, a QR code scanner 230, a cell inverter 240, and a control unit.

The turntable 210 may be rotated clockwise or counter-clockwise by a combination of a rotation shaft 210a coupled to a center thereof and a servomotor connected to the rotation shaft 210a. The servomotor may be controlled by the control unit.

Cell holders 211 may be provided at an edge of the turntable 210 at certain intervals in a circumferential direction. The cell holders 211 may be provided in the form of sockets into which a certain number of battery cells 20 may be respectively inserted.

In the present embodiment, four cell holders 211 are arranged on the turntable 210 in a square composition, and each cell holder 211 is configured to mount seven battery cells 20 in a row thereof. When necessary, the cell holder 211 may also be configured to have one or more rows and mount six or less or eight or more battery cells 20 in each row thereof.

The turntable 210 may be rotated by a certain angle such that each cell holder 211 is sequentially positioned at positions where the voltage measuring device 220, the QR code scanner 230, and the cell inverter 240 are respectively located. For example, the turntable 210 may be controlled such that, when a certain operation on the battery cells 20 is completed in units of each cell holder 211, the turntable 210 may be rotated so that a next operation is performed.

The turntable 210 enables to perform various operations simultaneously while rotating a certain number of battery cells 20, and thus may be useful in effectively implementing a space-efficient facility.

The voltage measuring device 220 is a means for measuring the open circuit voltage of the battery cells 20, and may include upper measuring pins 221 and lower measuring pins 222 and a measuring device driving member 223 for moving the upper and lower measuring pins 221 and 222 up and down or forward or backward.

Figure 4:
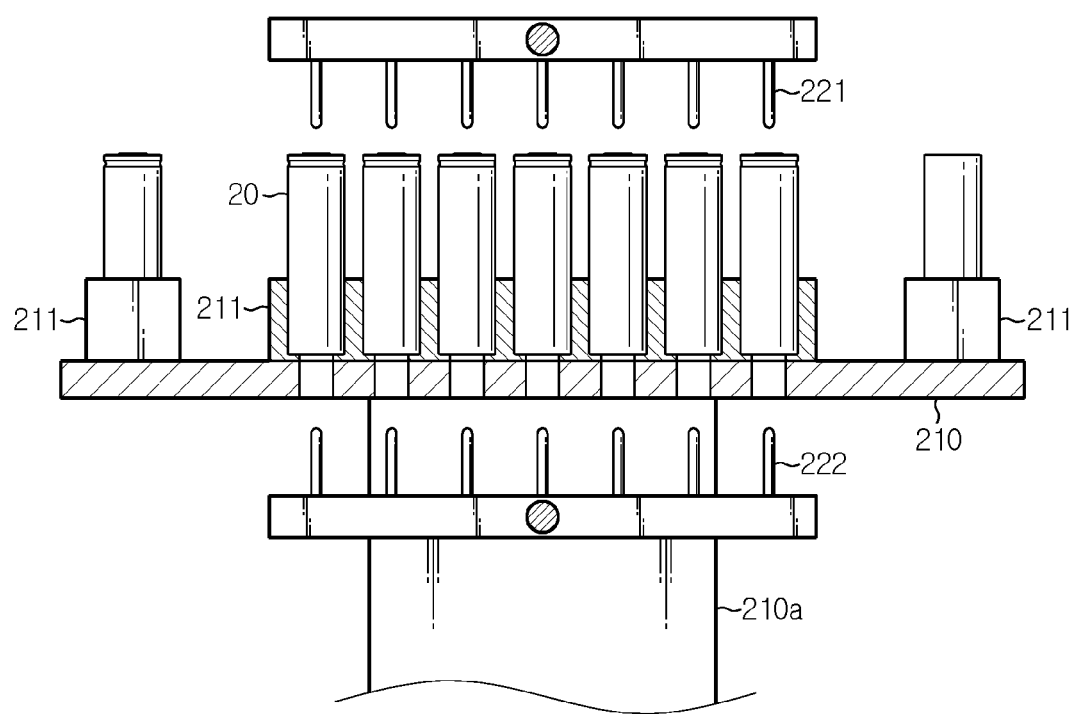
FIG. 4 illustrates a region of a voltage measuring device of a cell inspection unit, according to an embodiment of the present disclosure.

The battery cells 20 supplied from the cell transfer unit 100 may be respectively mounted in the cell holders 211, and as illustrated in FIG. 4, according to operation of the voltage measuring device 220, the upper measuring pins 221 and the lower measuring pins 222 may contact upper and lower ends of each battery cell 20 to measure an open circuit voltage of each battery cell 20, and a value of the measured open circuit voltage of each battery cell 20 may be transmitted to the control unit to determine whether the battery cell 20 is qualified and grade the battery cell 20.

Here, the upper measuring pins 221 and the lower measuring pins 222 may be configured to operate integrally or individually. Accordingly, the open circuit voltage of all battery cells 20 mounted in the cell holder 211 may be simultaneously measured, or open circuit voltages of some battery cells 20 may be measured and open circuit voltages of the remaining battery cells 20 may not be measured.

The battery cell 20 includes the QR code 20a. The QR code 20a may store product information such as the manufacturing date, capacity, specification, and a unique number of each battery cell 20. Here, the QR code 20a may be replaced with a barcode.

Figure 5:
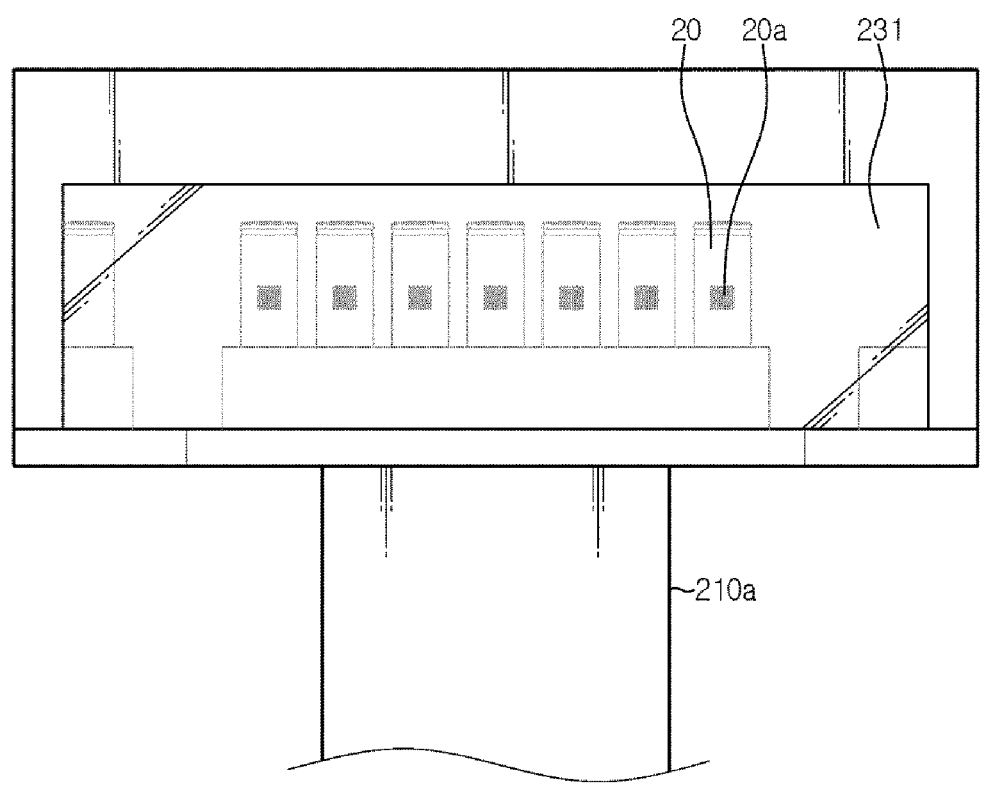
FIG. 5 illustrates a QR code scanner region of a cell inspection unit, according to an embodiment of the present disclosure.

As illustrated in FIG. 5, the QR code scanner 230 may include, as a means for scanning the QR code 20a of each battery cell 20, a transparent screen 231 and a camera 233 for scanning the QR code 20a of each battery cell 20, and may be configured to be connected to a data storage server provided for management of a history of each battery cell 20 and to the control unit in a wired or wireless manner.

The QR code scanner 230 identifies each battery cell 20 through a unique number stored in the QR code 20a of each battery cell 20 and transmits an open circuit voltage value of each battery cell 20 to the data storage server.

The QR code scanner 230 may be arranged opposite to the voltage measuring device 220 with the turntable 210 therebetween. This may be regarded as an arrangement structure for increasing the working space efficiency according to the arrangement of a plurality of frame transfer units 300 to be described later. Therefore, to add an inspection item on the arrangement of transfer units of the module frame 30 or the turntable 210, the positions of the voltage measuring device 220 and the QR code scanner 230 may be adjusted differently from present embodiment.

The cell inverter 240 is a means for performing an operation of changing a polarity of certain battery cells 20 so that the battery cells 20 may be directly inserted into the module frame 30 of the battery module after a voltage test and storing a test result. The cell inverter 240 may be arranged above one side edge of the turntable 210 and configured to invert, up and down, one or more of the battery cells 20 inserted into the cell holders 211.

For reference, in the case of a battery module consisting of cylindrical battery cells 20, in order to facilitate series and parallel connection between the battery cells, the battery cells may be inserted into the module frame 30 such that top caps of a group of battery cells 20, which function as a positive electrode, face upward, and top caps of another group of battery cells face downward. As described above, the cell inverter 240 may be used when it is necessary to selectively invert battery cells up and down before inserting the battery cells into a module frame.

In detail, the cell inverter 240 according to the present embodiment includes a clamp 241 configured to selectively hold each battery cell 20, a rotator 243 that rotates the clamp 241 by ±180 degrees, and a moving block 245 connected to the rotator 243 and configured to be movable in a vertical direction.

Figure 6:
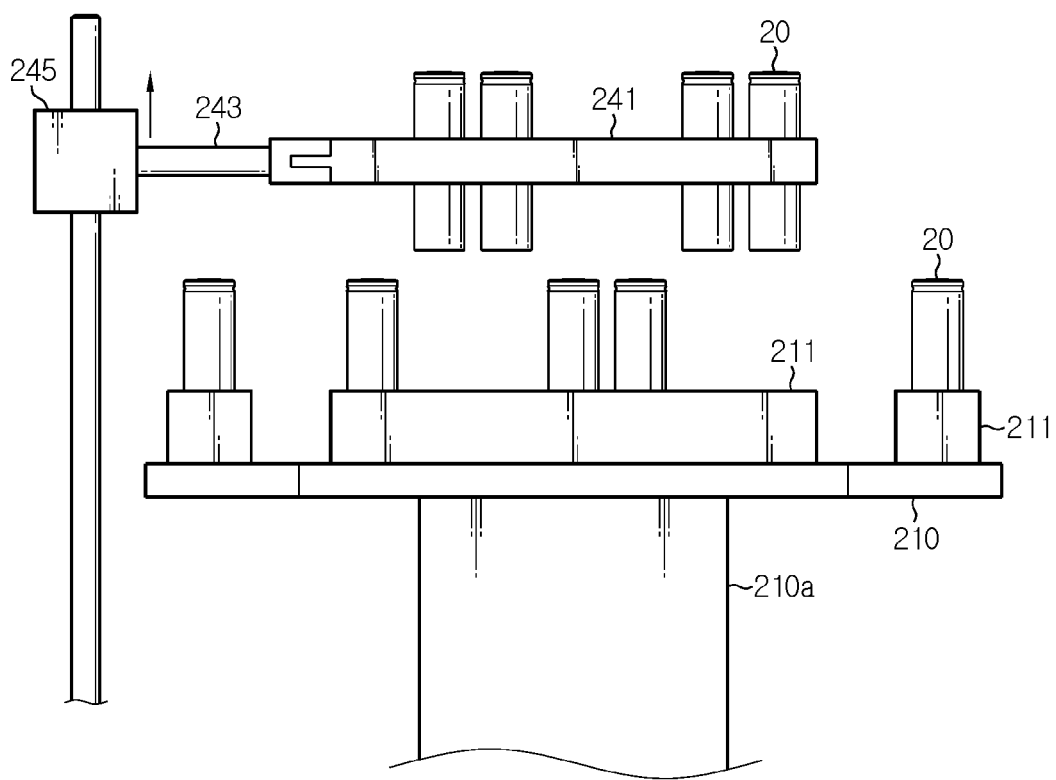
FIGS. 6 and 7 illustrate a region of a cell inverter of a cell inspection unit, according to an embodiment of the present disclosure.

An example of inverting a battery cell by the cell inverter 240 will be briefly described with reference to FIGS. 6 and 7.

The clamp 241 is positioned above the cell holder 211 and then descends to hold only the battery cells 20 required to be inverted, and then is lifted up again. Here, the clamp 241 may be configured to individually clamp each battery cell 20 so as to selectively hold those battery cells required to be inverted.

Figure 7:
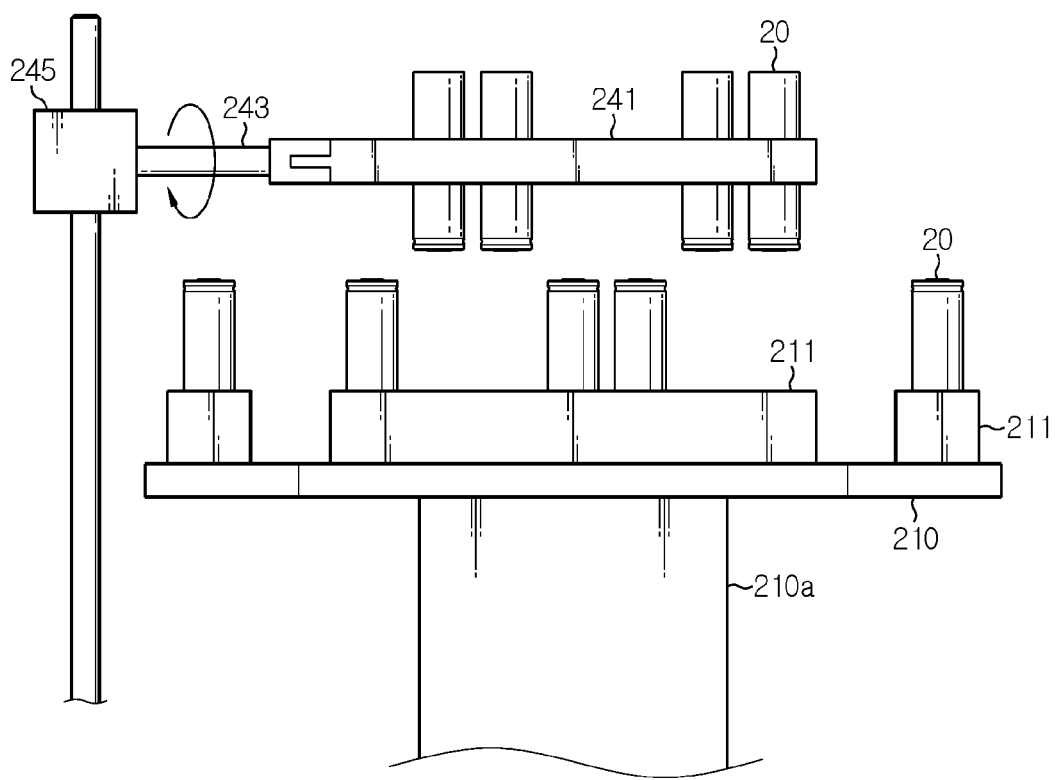

Then, as illustrated in FIG. 7, the clamp 241 is rotated 180 degrees by the rotator 243. Accordingly, the battery cells 20 held by the clamp 241 are inverted such that a top cap thereof faces downward. In this state, the moving block 245 operates and the clamp 241 descends to place the inverted battery cells 20 back to be seated in the cell holders 211.

As described above, by selectively inverting the battery cells up and down in advance by using the cell inverter 240 and then picking up all of the battery cells later from the cell holders 211 by using the gripper unit 400 and inserting the battery cells into the module frame 30 as they are, the assembling may be easy.

Here, the module frame 30 is a component of the battery module and refers to a structure for fixing the battery cells 20 and protecting the same from external impact. The battery module may be manufactured in a form in which, after the battery cells 20 are inserted into and arranged in the module frame 30, the battery cells 20 are electrically connected to each other by using a metal plate and a BMS or the like is assembled thereto, and a housing cover may be coupled to an upper portion of the module frame 30. The module frame 30 may be transferred using the frame transfer unit 300 to be supplied.

The frame transfer unit 300 is a means for supporting and moving the module frames 30, and may be implemented using, for example, a conveyor. The frame transfer unit 300 may also be replaced with any other device that stably performs logistics transportation, than the conveyor.

The frame transfer unit 300 (see FIG. 2) may include a first frame transfer unit 310 and a second frame transfer unit 320 extending and arranged in parallel with each other, with the cell inspection unit 200 therebetween.

As described above, by providing a plurality of frame transfer units 300, there is an advantage that a transportation line is dualized, and in particular, capacity deviation of a battery module may be further reduced by inserting the qualified battery cells 21 and 22 of different grades into the module frames 30 on the first frame transfer unit 310 and the module frames 30 on the second frame transfer unit 320, respectively.

Figure 8:
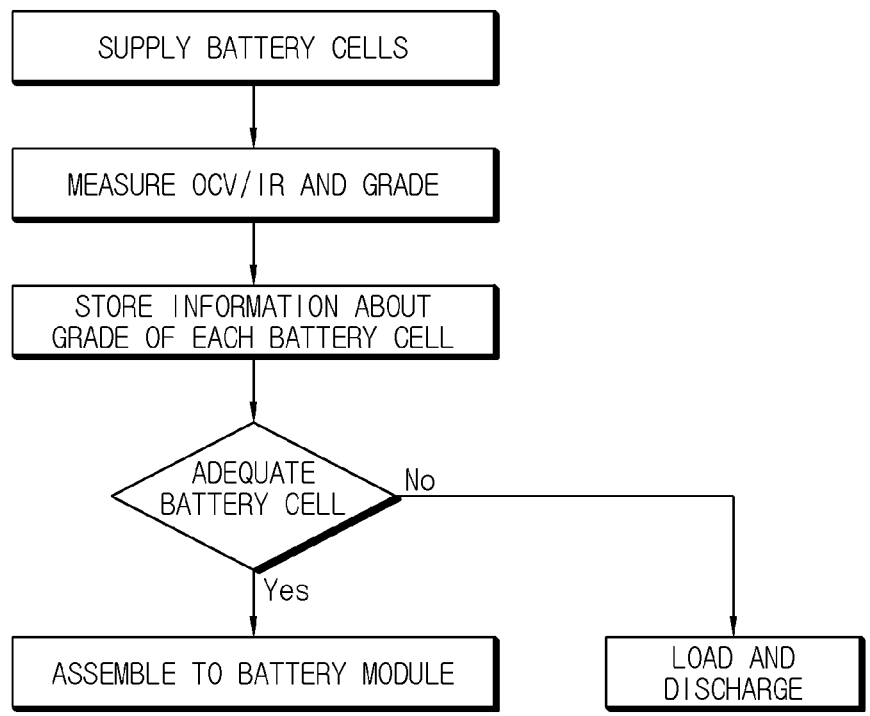
FIG. 8 is a flowchart of a battery cell grading and assembling method, according to an embodiment of the present disclosure.

Meanwhile, in the process automation system according to the present disclosure (see FIG. 8), the cell inspection unit 200 may include a control unit to determine whether battery cells are defective or not. The control unit may be configured to compare an open circuit voltage value of each battery cell 20, measured by the voltage measuring device 220, with a preset range of a preset open circuit voltage, and when the measured open circuit voltage value of each battery cell 20 falls within the preset range, the control unit may be configured to grade the battery cells 20 as qualified battery cells 21 and 22 and allow the same to be directly mounted in the module frame 30 of the battery module, and determine, as defective ones, those battery cells 20 having open circuit voltage values which are not in the preset range.

Furthermore, the control unit may be configured to divide the preset range into a first set range and a second set range again, and to classify the qualified battery cells 21 and 22 such that the first qualified battery cells 21 falling within the first set range are distinguished from the second qualified battery cells 22 falling within the second set range.

For example, when a preset range of an open circuit voltage value of the lithium ion cylindrical battery cell 20 is 3.58V to 3.50V, the preset range may be divided again such that the first set range may be set to 3.58V to 3.54V, and the second set range may be set to 3.5399V to 3.5V. In this case, the first qualified battery cells 21 refer to battery cells 20 having an open circuit voltage value within 3.58 V to 3.54 V, and the second qualified battery cells 22 refer to battery cells 20 having an open circuit voltage value within 3.5399 V to 3.5 V.

In addition, the control unit may be configured to control the gripper unit 400 such that the first qualified battery cells 21 are supplied to the first frame transfer unit 310 and the second qualified battery cells 22 are supplied to the second frame transfer unit 320.

By assembling battery cells into the module frame 30 by distinguishing the grades of the qualified battery cells 21 and 22, there is hardly a capacity difference between the battery cells 20 constituting each battery module, and thus, the quality and lifespan of the battery modules may be improved.

Defective battery cells 23 having an open circuit voltage value determined to be outside the preset range are not assembled into the module frame 30 and are managed to be separately discharged. To this end, the battery cell process automation system 10 according to the present disclosure further includes the cell discharging unit 500 for loading and discharging the defective battery cells 23.

The cell discharging unit 500 is arranged between the first frame transfer unit 310 and the second frame transfer unit 320, and may include a conveyor configured to move the discharge tray 40 provided to accommodate the defective battery cells 23.

In addition, the battery cell process automation system 10 according to the present embodiment may further include a temporary loading unit 600 to temporarily load the first qualified battery cells 21 or the second qualified battery cells 22 after classifying the first qualified battery cells 21 and the second qualified battery cells 22 and supply the same into the first frame transfer unit 310 or the second frame transfer unit 320 as described above. The temporary loading unit 600 will be described later.

The gripper unit 400 is a means for transporting the battery cells 20 between the cell transfer unit 100, the cell inspection unit 200, the frame transfer unit 300, and the cell discharging unit 500 described above, and may be configured to be in conjunction with the cell inspection unit 200 and pick up and transport one or more of the battery cells 20.

Referring back to FIG. 3, the gripper unit 400 may be configured with a combination of a plurality of fingers 410 for picking up the battery cell 20, a plurality of link arms 420 connected to the plurality of fingers 410 such that the plurality of fingers 410 are moved along the X-Y-Z axes, and a cylinder and a linear motor which are used for driving and a sensor for recognition of objects.

In the present embodiment, each of the seven fingers 410 may be configured to individually perform a grip operation. In other words, the seven fingers 410 may be configured to be able to select and transport, for example, only two or three battery cells 20, in addition to picking up and transporting seven battery cells 20 at a time.

Next, the process of classifying, according to grades, the battery cells 20 according to the process automation system 10 according to an embodiment of the present disclosure, and inserting the classified battery cells 20 into the module frame 30 will be further described in detail again with reference to FIGS. 2 and 3 below.

Seven battery cells 20 are picked up by the gripper unit 400 from the tray 40 on the cell transfer unit 100, and are inserted into the cell holders 211 on the turntable 210 on the side where the voltage measuring device 220 is located.

(Hereinafter, a portion of the turntable 210 at the voltage measuring device 220 will be referred to as a first region, and each region at every 90 degrees in a clockwise direction from the first region will be referred to as a second region, a third region, and a fourth region, respectively.)

Next, open circuit voltages of the seven battery cells 20 mounted in the cell holders 211 in the first region are measured by the voltage measuring device 220, and grades of the seven battery cells 20 are determined based on measured open circuit voltage values of the battery cells 20 and a preset voltage range.

When the grades of the battery cell 20 are determined as described above, the process automation system 10 may be operated as follows.

First, as a result of voltage measurement, all of the battery cells 20 may be the first qualified battery cells 21. In this case, the turntable 210 is sequentially rotated clockwise by 90 degrees and processes of measuring open circuit voltages, scanning the QR code 20a, storing the open circuit voltage of each battery cell 20 in the server, inverting some battery cells 20, and inserting the first qualified battery cells 21 into the module frame 30 of the first frame transfer unit 310 may be repeatedly performed.

For reference, in the cell holders 211 located in the fourth region where a cell inverting operation is performed, all the first qualified battery cells 21 are picked up from the fourth region and transferred to the first frame transfer unit 310, and thus, when the turntable 210 is rotated to return to the first region, the cell holders 211 are empty.

As a result of voltage measurement, when all the battery cells 20 are the second qualified battery cells 22, the same operations are performed in the same order as with respect to the first qualified battery cells 21 except for inserting the second qualified battery cells into the module frame 30 of the second frame transfer unit 320.

Second, there may be a case where, as a result of voltage measurement, the qualified battery cells 21 and 22 and the defective battery cells 23 are mixedly included. In this case, only the defective battery cells 23 are picked out using the gripper unit 400 and loaded into the cell discharging unit 500. In addition, new battery cells 20 are filled in portions from which the defective battery cells 23 are picked out, and voltage measurement is performed only on the above newly filled battery cells 20. As a result of voltage measurement, when the newly filled battery cells 20 are graded as qualified battery cells 21 and 22, the turntable 210 is rotated to perform the subsequent operations as in the first case.

Third, as a result of voltage measurement, there may be a case where the first qualified battery cells 21, the second qualified battery cells 22, and the defective battery cells 23 are mixedly included. In this case, the defective battery cells 23 are loaded into the cell discharging unit 500 by using the gripper unit 400, and the second qualified battery cells 22 are temporarily loaded into the temporary loading unit 600.

New battery cells 20 are filled in the cell holders 211 after the defective battery cells 23 and the second good battery cells 22 are picked out, and voltage measurement is performed only on the above newly filled battery cells 20. The above process may be repeated until all of the battery cells 20 filled in the cell holders 211 are the first qualified battery cells 21. When the cell holders 211 in the first region are completely filled with the first qualified battery cells 21, the turntable 210 is sequentially rotated to perform the subsequent operations.

By continuously repeating the above pattern, the number of second qualified battery cells 22 in the temporary loading unit 600 is increased. Therefore, after the second qualified battery cells 22 of a sufficient number are filled in the temporary loading unit 600, and when the cell holders 211 return in an empty state to the first region after one rotation of the turntable 210, the second qualified battery cells 22 are transferred to the cell holders 211 from the temporary loading unit 600, instead of the cell transfer unit 100, to perform the process.

Also, the first qualified battery cells 21 may be temporarily loaded into the temporary loading unit 600 instead of the second qualified battery cells 22, and only the first qualified battery cells 21 may be transferred to the turntable 210.

According to the configuration and operation of the battery cell process automation system 10 according to the present disclosure as described above, the grading of the battery cells 20 and the assembly operation of the battery module may be performed using a single facility, thereby significantly improving process efficiency and logistics transportation.

As described above, while the present disclosure has been described with reference to limited embodiments and drawings, the present disclosure is not limited thereto, and various modifications and variations may be made by those of ordinary skill in the art to which the present disclosure pertains within the scope of the present disclosure and the claims described below and equivalents thereof.

In the present specification, while terms indicating directions such as up, down, left, right, front, and back, etc. have been used, it will be obvious to those skilled in the art that these terms refer to relative positions and are only for convenience of description and may be expressed differently depending on the location of the object or the viewing position of the observer.

What is claimed is:

1. A process automation system comprising:
a cell transferor configured to transfer battery cells;
a cell inspector configured to measure an open circuit voltage of each battery cell in units of a preset number of battery cells and to sort out qualified battery cells and defective battery cells, the cell inspector including a turntable comprising cell holders arranged at an edge of the turntable in a circumferential direction, the turntable being configured to be rotated clockwise or counter-clockwise;
a frame transferor configured to transfer module frames of a battery module to insert the qualified battery cells;
a cell discharger configured to load and discharge the defective battery cells; and
a gripper configured to pick up one or more battery cells from any one device among the cell transferor, the cell inspector, the frame transferor, and the cell discharger, and transport the one or more battery cells to another device.

2. The process automation system of claim 1, wherein each of the battery cells comprises a QR code, and
wherein the cell inspector is configured to scan the QR code and transmit an open circuit voltage value of each battery cell to a server.

3. The process automation system of claim 2, wherein the cell inspector comprises:
a voltage measuring device configured to measure the open circuit voltage of each battery cell; and
a QR code scanner to scan the QR code of each battery cell.

4. The process automation system of claim 3, wherein the voltage measuring device and the QR code Scanner are arranged opposite to each other with the turntable therebetween.

5. The process automation system of claim 4, wherein the battery cells comprise cylindrical battery cells, and
wherein the cell inspector further comprises a cell inverter arranged above one side edge of the turntable and configured to invert, up and down, one or more battery cells inserted into the cell holders.

6. The process automation system of claim 5, wherein the cell inverter comprises:
a clamp configured to hold at least one of the battery cells inserted into the cell holders;
a rotator configured to rotate the clamp by ±180 degrees; and
a moving block connected to the rotator and configured to be movable in a vertical direction.

7. The process automation system of claim 5, wherein four cell holders are arranged on the turntable in a square composition, and the process automation system is configured such that, as the turntable is rotated, measurement of voltages of the battery cells respectively mounted in the cell holders, scanning of a QR code of the battery cells, vertical inversion of the battery cells are performed.

8. The process automation system of claim 4, wherein the turntable comprises holes corresponding to the battery cells respectively received in each cell holder.

9. The process automation system of claim 8, wherein the voltage measuring device includes upper measuring pins to contact a first side of the battery cells, respectively, and lower measuring pins to penetrate through the holes respectively to contact a second side of the battery cells.

10. The process automation system of claim 1, wherein the frame transferor comprises a first frame transferor and a second frame transferor extending and arranged in parallel with each other, and
wherein the cell inspector is arranged between the first frame transferor and the second frame transferor.

11. The process automation system of claim 10, wherein the cell inspector comprises a controller configured to determine battery cells having the open circuit voltage of a value falling within a preset first set range, as first qualified battery cells, and determine battery cells having the open circuit voltage of a value falling within a preset second set range, as second qualified battery cells.

12. The process automation system of claim 11, further comprising a temporary loader configured to temporarily load the first qualified battery cells or the second qualified battery cells prior to transfer to the first frame transferor or the second frame transferor.

13. The process automation system of claim 11, wherein the controller is further configured to control the gripper such that the first qualified battery cells are supplied to the first frame transferor and the second qualified battery cells are supplied to the second frame transferor.

14. The process automation system of claim 10, wherein the cell discharger is arranged between the first frame transferor and the second frame transferor.

15. The process automation system of claim 1, wherein the cell discharger comprises discharge trays provided to load the defective battery cells and a conveyor for moving the discharge trays.

16. The process automation system of claim 1, wherein the process automation system grades the battery cells and performs an assembly operation of the battery module by a single facility to improve process efficiency and logistics transportation.

* * * * *